US012665912B2

(12) United States Patent
Young et al.

(10) Patent No.: US 12,665,912 B2
(45) Date of Patent: Jun. 23, 2026

(54) DYNAMIC REGIONAL NETWORK ENCLAVE WITH ACTIVE THREAT INTELLIGENCE

(71) Applicant: Bank of America Corporation, Charlotte, NC (US)

(72) Inventors: Michael Young, Davidson, NC (US); Elizabeth M. Bennett, Charlotte, NC (US); Chantel Dyason, London (GB)

(73) Assignee: Bank of America Corporation, Charlotte, NC (US)

( * ) Notice: Subject to any disclaimer, the term of this patent is extended or adjusted under 35 U.S.C. 154(b) by 374 days.

(21) Appl. No.: 18/136,519

(22) Filed: Apr. 19, 2023

(65) Prior Publication Data
US 2024/0356941 A1 Oct. 24, 2024

(51) Int. Cl.
*H04L 9/40* (2022.01)
*G06N 5/022* (2023.01)

(52) U.S. Cl.
CPC ......... *H04L 63/1425* (2013.01); *G06N 5/022* (2013.01); *H04L 63/1416* (2013.01); *H04L 63/1441* (2013.01)

(58) Field of Classification Search
CPC ............. H04L 63/1425; H04L 63/1416; H04L 63/1441; H04L 63/1433; G06N 5/022; G06N 20/00
See application file for complete search history.

(56) References Cited

U.S. PATENT DOCUMENTS

| | | | |
|---|---|---|---|
| 9,536,063 B2 | 1/2017 | Xing et al. | |
| 9,577,829 B1 | 2/2017 | Roth et al. | |
| 9,584,517 B1 | 2/2017 | Roth et al. | |
| 9,876,788 B1 * | 1/2018 | Ziraknejad | G06F 21/34 |
| 10,218,711 B2 | 2/2019 | Smith et al. | |
| 10,218,735 B2 | 2/2019 | Strom et al. | |
| 10,552,138 B2 | 2/2020 | Smith et al. | |

(Continued)

FOREIGN PATENT DOCUMENTS

| | | | |
|---|---|---|---|
| EP | 3235161 B1 | 4/2020 | |
| EP | 3452929 B1 | 4/2020 | |

(Continued)

*Primary Examiner* — Hany S. Gadalla
(74) *Attorney, Agent, or Firm* — Banner & Witcoff, Ltd.

(57) ABSTRACT

A computing platform may train, using historical intelligence information, an enclave management model, which may configure the enclave management model to identify network actions to address current intelligence information, produce threat scores, and identify regional enclaves, each defining network boundaries for the respective regional enclaves. The computing platform may input, into the enclave management model, current intelligence information, which may cause the enclave management model to produce a threat score for a first geographic region and the network actions to address the current intelligence information. Based on identifying that the security score meets or exceeds a threat threshold, the computing platform may send one or more commands directing one or more network switching devices, corresponding to a first regional enclave for the first geographic region, to execute the network actions, which may cause the one or more network switching devices to execute the network actions.

20 Claims, 9 Drawing Sheets

(56)                References Cited

U.S. PATENT DOCUMENTS

| | | | |
|---|---|---|---|
| 10,592,670 | B2 | 3/2020 | Poornachandran et al. |
| 11,423,159 | B2 | 8/2022 | Desai et al. |
| 2009/0210699 | A1 | 8/2009 | Grewal et al. |
| 2010/0318799 | A1 | 12/2010 | Simon et al. |
| 2010/0318800 | A1 | 12/2010 | Simon et al. |
| 2014/0359777 | A1* | 12/2014 | Lam ...................... G06F 21/577 |
| | | | 726/25 |
| 2019/0260786 | A1* | 8/2019 | Dunn .................. H04L 63/1425 |
| 2019/0387021 | A1 | 12/2019 | Wyatt et al. |
| 2020/0366702 | A1 | 11/2020 | Mahaffey et al. |
| 2021/0073449 | A1* | 3/2021 | Segev ..................... G06F 30/27 |
| 2021/0281553 | A1 | 9/2021 | Ward et al. |
| 2023/0164158 | A1* | 5/2023 | Fellows ............. H04L 63/1441 |
| | | | 726/23 |

FOREIGN PATENT DOCUMENTS

| | | | |
|---|---|---|---|
| JP | 6055561 | B2 | 12/2016 |
| KR | 101707462 | B1 | 2/2017 |
| TW | I570589 | B | 2/2017 |

* cited by examiner

102

111

112

113

Dynamic Enclave Management System

Processor(s)

Memory(s)

Dynamic Enclave Management Module
112a

Dynamic Enclave Management Database
112b

Machine Learning Engine
112c

Communication Interface(s)

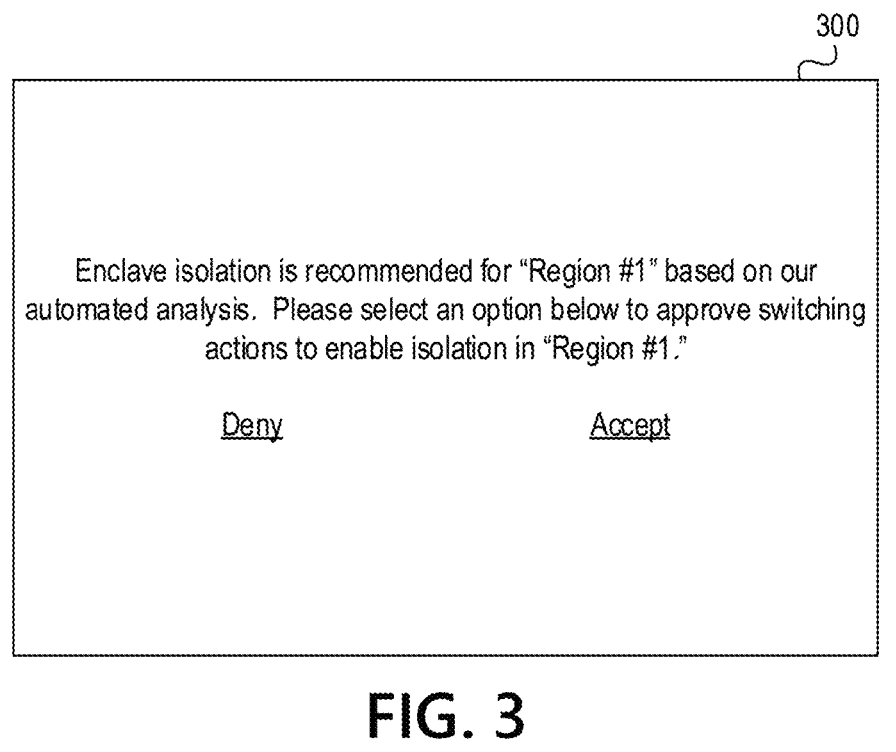

300

Enclave isolation is recommended for "Region #1" based on our automated analysis. Please select an option below to approve switching actions to enable isolation in "Region #1."

Deny                    Accept

FIG. 3

DYNAMIC REGIONAL NETWORK ENCLAVE WITH ACTIVE THREAT INTELLIGENCE

BACKGROUND

In some instances, network control boundaries may be used to provide selective levels of network isolation and network traffic control to protect against various threats. In these instances, however, the modification of such boundaries may be rigid, and response times (e.g., in implementing the network isolation, traffic control, and/or otherwise) may be significant, which may impede the ability to dynamically and/or briskly respond to world events, changing network conditions, or the like. Accordingly, cyber threats may be able to permeate and/or otherwise spread across a network, thus causing data exposure, and/or other affects. It may be important to improve the flexibility and response time of such network control boundaries to provide improved protection against cyber threats.

SUMMARY OF THE INVENTION

Aspects of the disclosure provide effective, efficient, scalable, and convenient technical solutions that address and overcome the technical problems associated with cyber threat mitigation. In accordance with one or more embodiments of the disclosure, a computing platform comprising at least one processor, a communication interface, and memory storing computer-readable instructions may obtain historical intelligence information corresponding to a plurality of intelligence parameters. The computing platform may train, using the historical intelligence information, an enclave management model, which may configure the enclave management model to identify network actions to address current intelligence information, to produce threat scores, and to identify regional enclaves, each defining network boundaries for the respective regional enclaves. The computing platform may receive current intelligence information corresponding to the plurality of intelligence parameters. The computing platform may input, into the enclave management model, the current intelligence information, which may cause the enclave management model to produce a threat score for a first geographic region and the network actions to address the current intelligence information. The computing platform may compare the threat score to a threat threshold. Based on identifying that the security score meets or exceeds the threat threshold, the computing platform may send one or more commands directing one or more network switching devices, corresponding to a first regional enclave for the first geographic region, to execute the network actions, which may cause the one or more network switching devices to execute the network actions.

In one or more instances, the plurality of intelligence parameters may include one or more of: government intelligence, open source intelligence, indicators of compromise (IOC), internet information, real time event information, risk indicators, sanction information, local regulations, cyber threat information, geographic information, regionally specific threat profile information, and/or other information. In one or more instances, training the enclave management model may include training a supervised machine learning model by labelling the historical intelligence information with a threat indicator prior to inputting the historical intelligence information into the enclave management model for training.

In one or more examples, the computing platform may obtain network switching information, defining location and connection information for the one or more network switching devices. In one or more examples, training the enclave management model may include establishing a switch matrix, based on the network switching information, defining correlations between a plurality of geographic regions, including the first geographic region, and corresponding network enclaves, comprising network switching devices, of the one or more network switching devices, configured to establish a network boundary for the corresponding geographic region.

In one or more instances, the current intelligence information may correspond to at least one other geographic region, different than the first geographic region. In one or more instances, the threat threshold may be specific to the first geographic region, and at least one other geographic region may have a different threat threshold.

In one or more examples, the network actions may include one or more of: causing the one or more network switching devices to isolate the first geographic region, causing the one or more network switching devices to isolate a second geographic region, different than the first geographic region, causing the one or more network switching devices to modify a boundary of the first regional enclave, causing the one or more network switching devices to modify a boundary of a second regional enclave, corresponding to the second geographic region, causing the one or more network switching devices to log inbound network traffic, and causing the one or more network switching devices to route the inbound network traffic to an isolation system for analysis. In one or more examples, the second geographic region may correspond to an origin of a threat identified in the current intelligence information.

In one or more instances, the computing platform may identify, at a second time, after a first time at which the threat score is produced, that an updated threat score for the first geographic region is less than the threat threshold. Based on identifying that the updated threat score is lower than the threat threshold, the computing platform may suspend the network actions. In one or more instances, the computing platform may update, using a dynamic feedback loop and based on the threat score, the network actions, and the current intelligence information, the enclave management model.

BRIEF DESCRIPTION OF DRAWINGS

The present disclosure is illustrated by way of example and not limited in the accompanying figures in which like reference numerals indicate similar elements and in which:

FIG. 3 depicts an illustrative user interface for implementing dynamic regional network enclaves using active threat intelligence in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to dynamic network enclaves that use artificial intelligence for active threat mitigation. For example, enclave network control boundaries define a set of network security capabilities that enable selective levels of network isolation and network traffic control, up to full network isolation. Network enclaves may traditionally be managed through manual controls and interventions, and often may be centered around one geographic or civic boundary (e.g., a country). This type of solution may result in long lead times for changes and enhancements and might not be able to dynamically or briskly respond to world events or changing network conditions.

The systems and methods described herein leverage software defined networking to automate the scope, size, and boundaries of a network enclave in response to threats or inputs from risk indicators and cyber threat intelligence generated from real-world events. Using software defined networking and artificial intelligence, the network enclaves may be created, destroyed, changed, and/or upgraded in real-time in response to world or technological challenges. In addition, with the possibility of network conditions being threatened in the event of a cyber-attack, the artificial intelligence will be able to harden or shift network controls while also logging all traffic or probes at an enhanced level to allow for future forensics.

These systems and methods are unique in leveraging the combination of automated cyber threat intelligence processing, software defined networking, and artificial intelligence to create a dynamic network construct that can react and mold itself to real-world conditions on internal networks, the larger internet, and cyber threats.

Figure 1A:
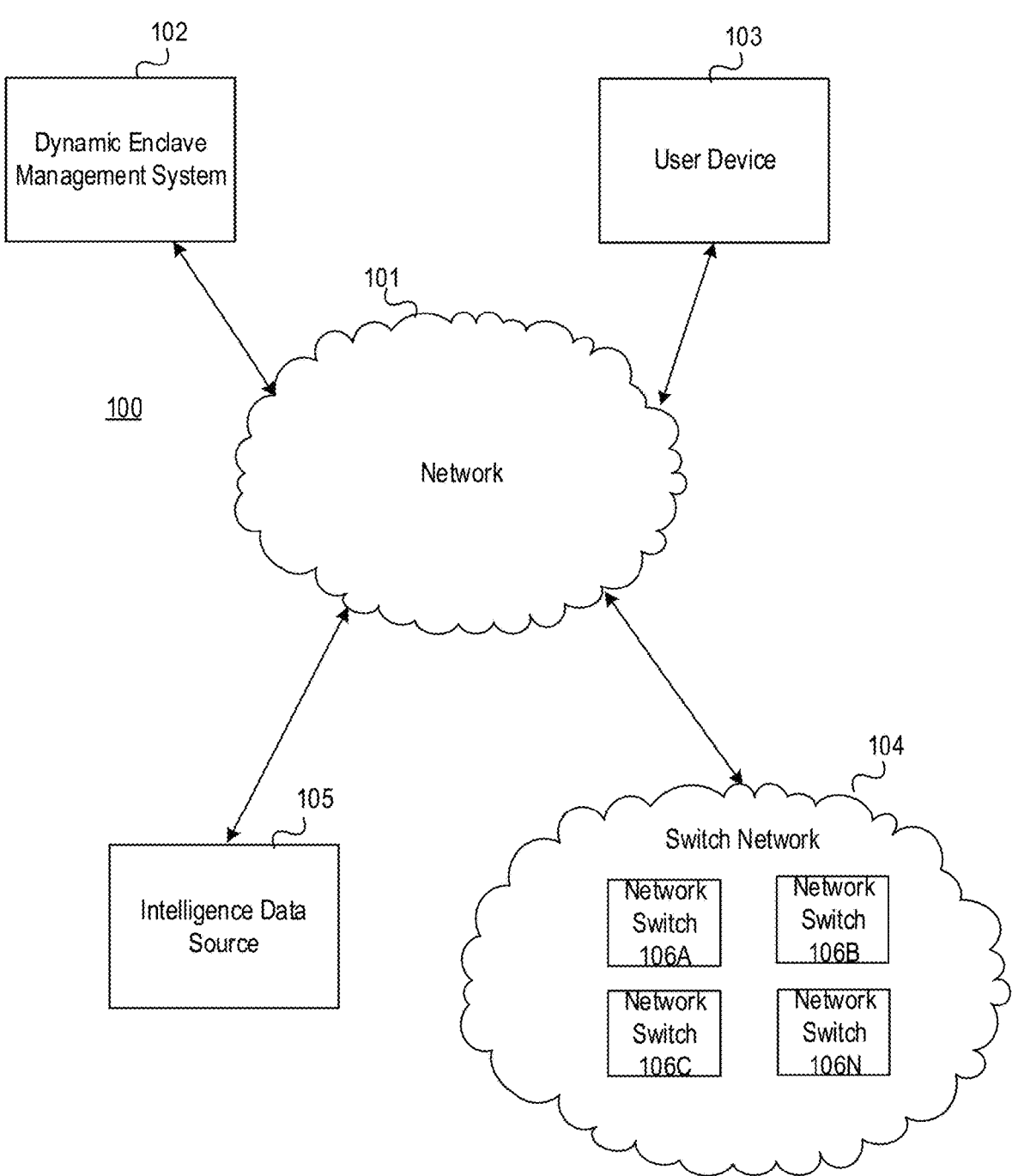
FIGS. 1A-1B depict an illustrative computing environment for implementing dynamic regional network enclaves using active threat intelligence in accordance with one or more example embodiments.
Figure 1B:
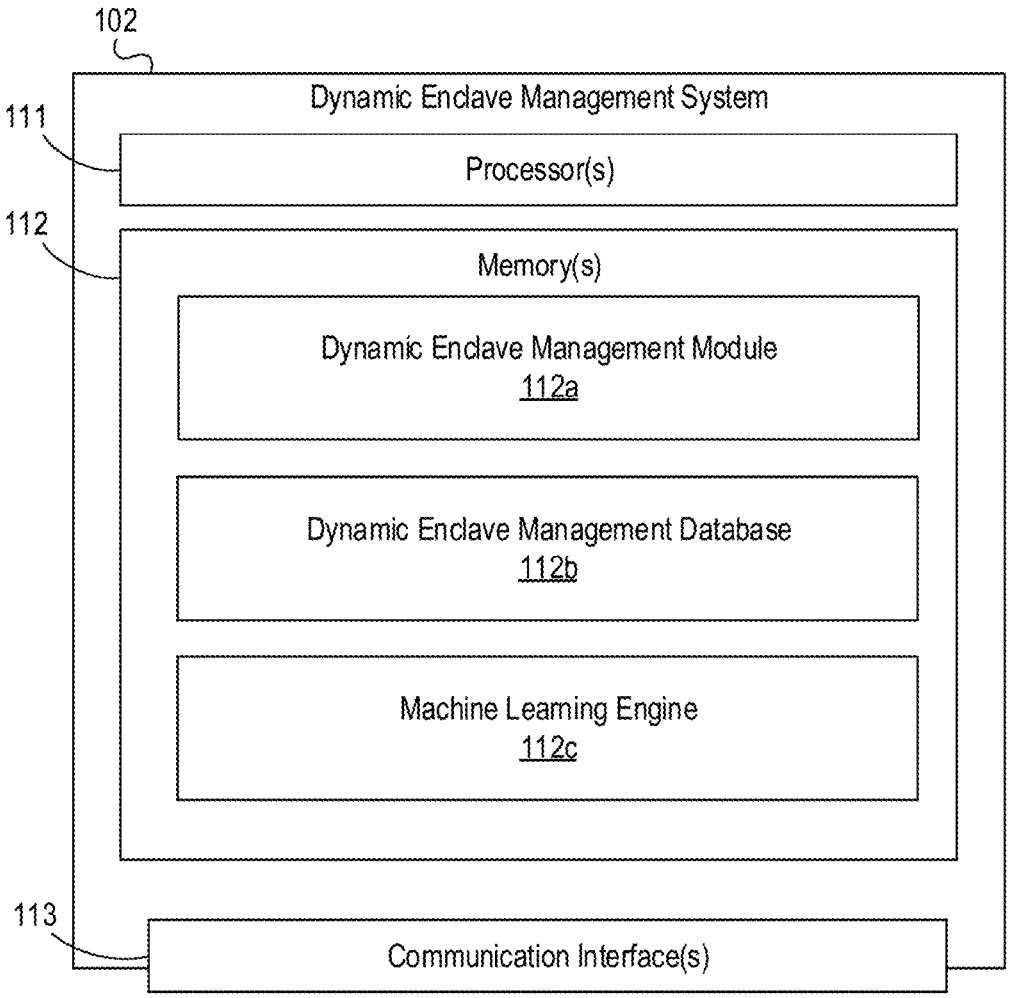

FIGS. 1A-1B depict an illustrative computing environment for managing dynamic network enclaves with artificial intelligence for active threat mitigation in accordance with one or more example embodiments. Referring to FIG. 1A, computing environment 100 may include one or more computer systems. For example, computing environment 100 may include a dynamic enclave management system 102, user device 103, switch network 104, and intelligence data source 105.

Dynamic enclave management system 102 may include one or more computing devices and/or other computer components (e.g., processors, memories, communication interfaces, or the like). For example, the dynamic enclave management system 102 may configure a plurality of network enclaves, which may, e.g., define network switch boundaries for geographic regions, enterprises, individuals, or the like. In some instances, the dynamic enclave management system 102 may generate a switch matrix, which may include correlations between the network enclaves and the corresponding switches. In some instances, the dynamic enclave management system 102 may be configured to train, host, and/or otherwise refine a machine learning model, configured to identify, based on threat information, threat scores for the various enclaves and security actions to be performed based on the scores, as described further below with regard to FIG. 1B.

User device 103 may be or include one or more devices (e.g., laptop computers, desktop computer, smartphones, tablets, and/or other devices) configured for use in the execution of security actions. For example, the user device 103 may be configured to communicate with the dynamic enclave management system 102 to provide approval to execute the security actions. In some instances, the user device 103 may be operated or otherwise associated with employees of an enterprise organization (e.g., an enterprise corresponding to the dynamic enclave management system 102). In other instances, the user of the user device 103 might not correspond to the enterprise organization, and may instead be a neutral approver, configured to provide approval on behalf of a number of organizations, individuals, entities, or the like. In some instances, the user device 103 may be configured to display graphical user interfaces (e.g., approval interfaces, or the like). Any number of such user devices may be used to implement the techniques described herein without departing from the scope of the disclosure. For example, a plurality of user devices may be used to provide consensus approval.

Switch network 104 may include a collection of network switching devices (e.g., network switches 106A-106N). Although shown as a unique network, this is for illustrative purposes only, and switch network 104 may be and/or otherwise correspond to the network 101 without departing from the scope of the disclosure. Each network switch may be configured to enable or prevent network traffic from passing through the corresponding network switch, and may be configured to do so based on instructions from dynamic enclave management system 102. Any number of such network switches 106A-106N may be used to implement the techniques described herein without departing from the scope of the disclosure.

Intelligence data source 105 may be or include one or more computing devices (e.g., servers, server blades, or the like) and/or computer components (e.g., processors, memories, communication interfaces, and/or other components). Intelligence data source 105 may be configured to store and/or otherwise provide intelligence information such as government intelligence, open source intelligence, indicators of compromise (IOC), internet information, real time event information, risk indicators, sanction information, local regulations, cyber threat information, geographic information, regionally specific threat profile information, and/or other information). Although illustrated as a single device, any number of data sources may provide intelligence information without departing from the scope of the disclosure.

Computing environment 100 also may include one or more networks, which may interconnect dynamic enclave management system 102, user device 103, switch network 104, and intelligence data source 105. For example, computing environment 100 may include a network 101 (which may interconnect, e.g., dynamic enclave management system 102, user device 103, switch network 104, and intelligence data source 105).

In one or more arrangements, dynamic enclave management system 102, user device 103, network switches 106A-106N, and intelligence data source 105 may be any type of computing device capable of receiving a user interface, receiving input via the user interface, and communicating the received input to one or more other computing devices. For example, dynamic enclave management system 102, user device 103, switch network 104, and intelligence data source 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic enclave management system 102, user device 103, switch network 104, and intelligence data source 105 may, in some instances, be special-purpose computing devices configured to perform specific functions.

Referring to FIG. 1B, dynamic enclave management system 102 may include one or more processors 111, memory 112, and communication interface 113. A data bus may interconnect processor 111, memory 112, and communication interface 113. Communication interface 113 may be a network interface configured to support communication between dynamic enclave management system 102 and one or more networks (e.g., network 101, or the like). Memory 112 may include one or more program modules having instructions that when executed by processor 111 cause dynamic enclave management system 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic enclave management system 102 and/or by different computing devices that may form and/or otherwise make up dynamic enclave management system 102. For example, memory 112 may have, host, store, and/or include dynamic enclave management module 112a, dynamic enclave management database 112b, and machine learning engine 112c. Dynamic enclave management module 112a may have instructions that direct and/or cause dynamic enclave management system 102 to execute advanced techniques for dynamically managing network enclaves using active threat intelligence, executing security actions using the network enclaves, and/or performing other actions. Dynamic enclave management database 112b may store information used by container dynamic enclave management module 112a, and/or other modules in dynamically managing network enclaves using active threat intelligence, executing security actions using the network enclaves, and/or performing other actions. Machine learning engine 112c may be used to train, deploy, and/or otherwise refine models used to support functionality of the dynamic enclave management module 112a through both initial training and one or more dynamic feedback loops, which may, e.g., enable continuous improvement of the dynamic enclave management system 102 and further optimize the management of network enclaves for use in executing network security actions.

Figure 2A:
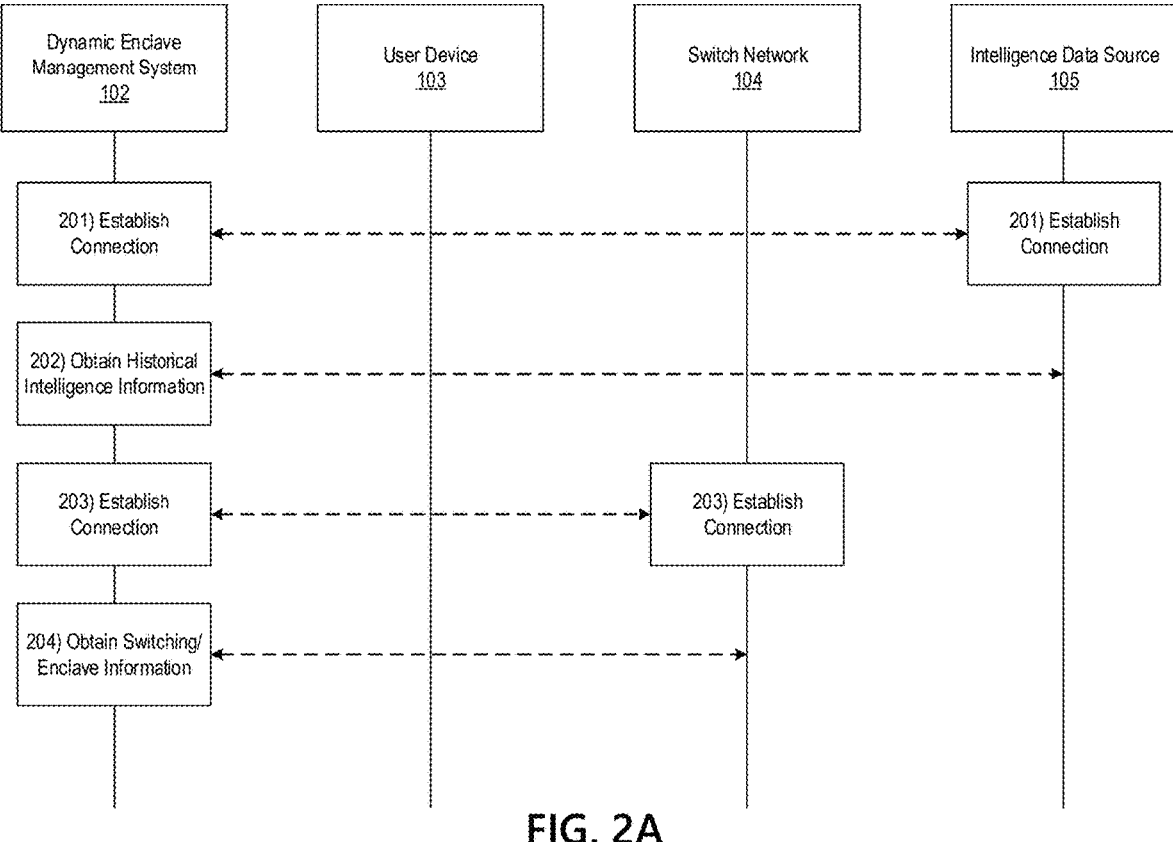
FIGS. 2A-2D depict an illustrative event sequence for implementing dynamic regional network enclaves using active threat intelligence in accordance with one or more example embodiments.

FIGS. 2A-2D depict an illustrative event sequence for managing dynamic network enclaves with artificial intelligence for active threat mitigation in accordance with one or more example embodiments. Referring to FIG. 2A, at step 201, the dynamic enclave management system 102 may establish a connection with the intelligence data source 105.

For example, the dynamic enclave management system 102 may establish a first wireless data connection with the intelligence data source 105 to link the dynamic management system 102 to the intelligence data source 105 (e.g., in preparation for obtaining historical intelligence information). In some instances, the dynamic enclave management system 102 may identify whether or not a connection is already established with the intelligence data source 105. If a connection is already established with the intelligence data source 105, the dynamic enclave management system 102 might not re-establish the connection. If a connection is not yet established with the intelligence data source 105, the dynamic enclave management system 102 may establish the first wireless data connection as described herein.

At step 202, the dynamic enclave management system 102 may obtain historical intelligence information from the intelligence data source 105. For example, the dynamic enclave management system 102 may obtain government intelligence information, open source intelligence information, indicators of compromise (IOC), internet information, real time event information, risk indicators, sanction information, local regulations, cyber threat information, geographic information, regionally specific threat profile information, and/or other information. In some instances, the historical intelligence information may correspond to a plurality of geographic regions. In some instances, the dynamic enclave management system 102 may obtain the historical intelligence information from the intelligence data source 105 via the communication interface 113 and while the first wireless data connection is established.

At step 203, the dynamic enclave management system 102 may establish a connection with one or more network switches 106A-106N on the switch network 104. For example, the dynamic enclave management system 102 may establish a second wireless data connection with the switch network 104 to link the dynamic enclave management system 102 to the switch network 104 (e.g., in preparation for obtaining switching/enclave information). In some instances, the dynamic enclave management system 102 may identify whether or not a connection is already established with the switch network 104. If a connection is already established with the switch network 104, the dynamic enclave management system 102 might not re-establish the connection. If a connection is not yet established with the switch network 104, the dynamic enclave management system 102 may establish the second wireless data connection as described herein.

At step 204, the dynamic enclave management system 102 may obtain switching/enclave information from the switch network 104. For example, the dynamic enclave management system 102 may obtain network switching information, defining location and connection information for the one or more network switches (106A-106N). In some instances, the dynamic enclave management system 102 may obtain the switching/enclave information from the switch network 104 via the communication interface 113 and while the second wireless data connection is established.

Figure 2B:
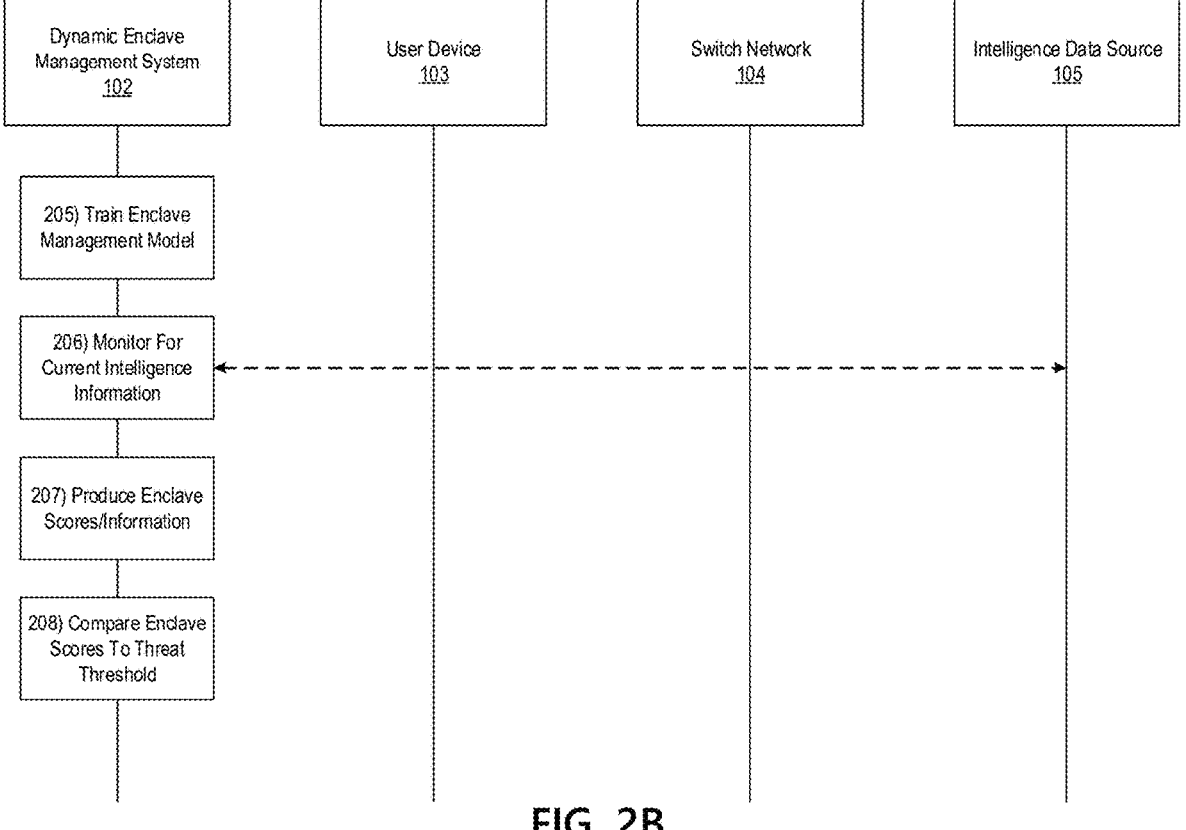

Referring to FIG. 2B, at step 205, the dynamic enclave management system 102 may train and/or otherwise configure an enclave management model. For example, the dynamic enclave management system 102 may train the enclave management model to output threat scores for geographic regions corresponding to given intelligence information (e.g., network enclaves), and corresponding network security actions. For example, the enclave management model may be trained to identify scores indicative of a threat level in the given geographic region/enclave. In some instances, to train the enclave management model to do so, the historical intelligence information may be labelled with a threat indicator (e.g., a numerical value between 0 and 10, with 0 being the least likely to correspond to a threat and 10 being the most likely to correspond to a threat, or the like) indicating a corresponding likelihood or degree of threat. In doing so, the enclave management model may be trained to identify correlations between the government intelligence information, open source intelligence information, indicators of compromise (IOC), internet information, real time event information, risk indicators, sanction information, local regulations, cyber threat information, geographic information, regionally specific threat profile information, and/or other information and such threat indicators/scores. Based on a collection of such information and the parameter specific threat indicators/scores, the enclave management model may be trained to identify an overall threat score for a given geographic region/enclave. For example, the enclave management model may add all scores for the enclave and divide by the number of scores (which may, e.g., weight the various parameters evenly). In other instances the enclave management model may apply different weights to the various parameters.

Figure 5:
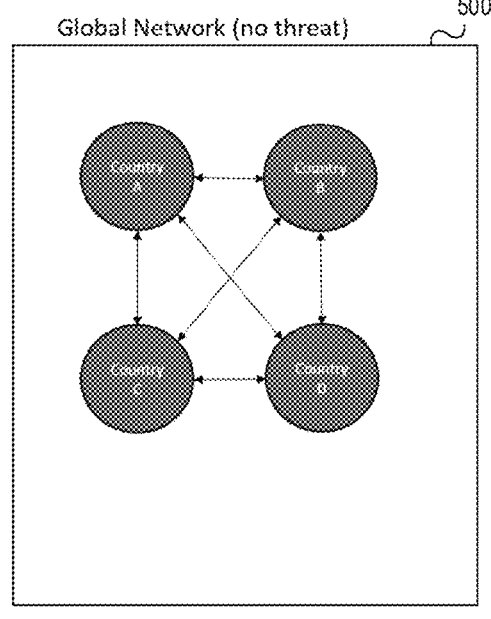
FIGS. 5 and 6 depict illustrative diagrams depicting dynamic regional network enclaves using active threat intelligence in accordance with one or more example embodiments.
Figure 6:
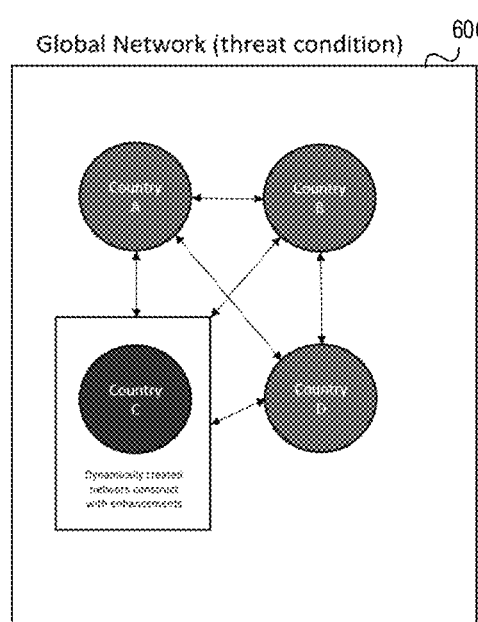

In some instances, in training the enclave management model, the dynamic enclave management system 102 may establish, using the network switching information received at step 204, a switch matrix defining correlations between a plurality of geographic regions and corresponding network enclaves, comprising subsets of the network switches 106A-106N, configured to establish a network boundary for the corresponding geographic regions. In doing so, the enclave management model may be trained to identify network enclaves corresponding to geographic regions associated with the above described overall threat scores. Such network enclaves may be illustrated, for example, in diagrams 500 and 600, which are shown in FIGS. 5 and 6, respectively. For example, enclaves may be created on a country by country basis, e.g., as represented by the circles around "Country A" through "Country D" in FIG. 5. When no threat is detected, no action may be taken with regard to any of the network enclaves. On the other hand, if a threat is detected, the network enclaves may be used to isolate and/or otherwise protect against the spread of the threat (e.g., as shown with regard to the isolation of "Country C" in FIG. 6). Although such enclaves are illustrated in FIGS. 5 and 6 as corresponding to different countries, the enclaves may, in some instances, correspond to other geographic boundaries and/or non-geographic boundaries (e.g., enterprises, groups of individuals, or the like) without departing from the scope of the disclosure.

In some instances, in training the enclave management model, the dynamic enclave management system 102 may train the enclave management model to produce, based on the overall threat score and for the corresponding network enclave, one or more network security actions. For example, the dynamic enclave management system 102 may set one or more threshold ranges, each associated with a corresponding network security action. The enclave management model may be trained to compare the overall threat score for a given network enclave to the threshold ranges, and to select a network security action accordingly. In some instances, the enclave management model may be configured to dynamically adjust the threshold ranges and/or the corresponding network security actions. In some instances, in addition or as an alternative to training the enclave management model to identify the network security actions based on the threshold ranges, the enclave management model may be trained to identify the network security actions based on comparison to historically executed network security actions used to address historically identified threats.

In some instances, in training the enclave management model, the dynamic enclave management system 102 may train a supervised learning model. For example, the dynamic enclave management system 102 may train one or more of: decision trees, ensembles (e.g., boosting, bagging, random forest, or the like), neural networks, linear regression models, artificial neural networks, logistic regression models, support vector machines, and/or other supervised learning models to initially train the enclave management model using labelled historical intelligence information. In some instances, once the enclave management model has been initially trained, the dynamic enclave management system 102 may continue to train the enclave management model using one or more unsupervised learning techniques (e.g., classification, regression, clustering, anomaly detection, artificial neutral networks, and/or other supervised models/ techniques) through a dynamic feedback loop (e.g., as is described further below with regard to step 217).

With further reference to FIG. 2B, at step 206, the dynamic enclave management system 102 may monitor the intelligence data source 105 to obtain current intelligence information. For example, the dynamic enclave management system 102 may obtain government intelligence information, open source intelligence information, indicators of compromise (IOC), internet information, real time event information, risk indicators, sanction information, local regulations, cyber threat information, geographic information, regionally specific threat profile information, and/or other information. In some instances, the dynamic enclave management system 102 may obtain the current intelligence information from the intelligence data source 105 via the communication interface 113 and while the first wireless data connection is established.

At step 207, the dynamic enclave management system 102 may input the current intelligence information into the enclave management model (e.g., trained at step 205) to produce threat scores for a plurality of network enclaves (e.g., covering a number of different geographic regions). For example, the enclave management model may identify, using the switch matrix, the different network enclaves. Then, the enclave management model may identify, for each network enclave, an overall threat score. For example, the enclave management model may compare the current intelligence information to the historical intelligence information stored in and/or otherwise used to train the enclave management model, identify multiple threat scores corresponding to different parameters of the current intelligence information, and identify an overall threat score (based on the parameter threat scores) for each of the network enclaves. In doing so, the dynamic enclave management system 102 may effectively monitor for threats across all of the various network enclaves continuously and simultaneously.

At step 208, the enclave management model may compare, for each network enclave, the corresponding overall threat score to the plurality of threat score ranges defined in the enclave management model. In doing so, the enclave management model may identify a network security action for the corresponding network enclaves. For example, a first threshold range (e.g., defined by an upper bound of a first threshold) may include threat scores between 0 and 3 (inclusive), a second threshold range (e.g., defined by a lower bound of the first threshold and an upper bound of a second threshold) may include threat scores between 4 and 7 (inclusive), and a third threshold range (e.g., defined by a lower bound of the second threshold) may include threat scores between 8 and 10 (inclusive).

In some instances, each threshold range may include a corresponding network security action. For example, if a threat score for a given network enclave is within the first threshold range, no network action may be performed and the event sequence may proceed to step 217 with regard to that network enclave. If the threat score for a given network enclave is in the second threshold range, the event sequence may proceed to step 209 to request approval of the network action. If the threat score for a given network enclave is in the third threshold range, the event sequence may proceed to step 214 to automatically send commands to cause a network action to initiate. Additionally or alternatively, specific network actions may be tied to these threshold ranges (e.g., network actions similar to those defined below with regard to step 214). For example, if the threat score is within the second threshold range, only the network enclave corresponding to the threat may be isolated, whereas if the threat score is within the third threshold range, the network enclave corresponding to the threat may be isolated as well as one or more network enclaves to which the threat has not yet spread (e.g., pre-emptive isolation of an enclave in a defensive nature). These ranges and actions are merely examples, and any number of different ranges/corresponding actions may be implemented without departing from the scope of the disclosure.

In some instances, the threshold ranges may vary between network enclaves, geographic regions, or the like. For example, a higher risk tolerance may be associated with a first network enclave than a second network enclave, and thus the threshold ranges may grant greater leniency to threats identified on the first network enclave (e.g., the first threshold range may be more expansive for the first network enclave than for the second network enclave).

In some instances, rather than selecting the network actions based on the threat ranges, the enclave management model may have been trained to identify network actions based on comparison to historically executed network actions for the identified threat type. In these instances, the enclave management model may select the network actions according to that method (e.g., in addition or as an alternative to selecting the network actions based on the threat ranges).

Figure 2C:
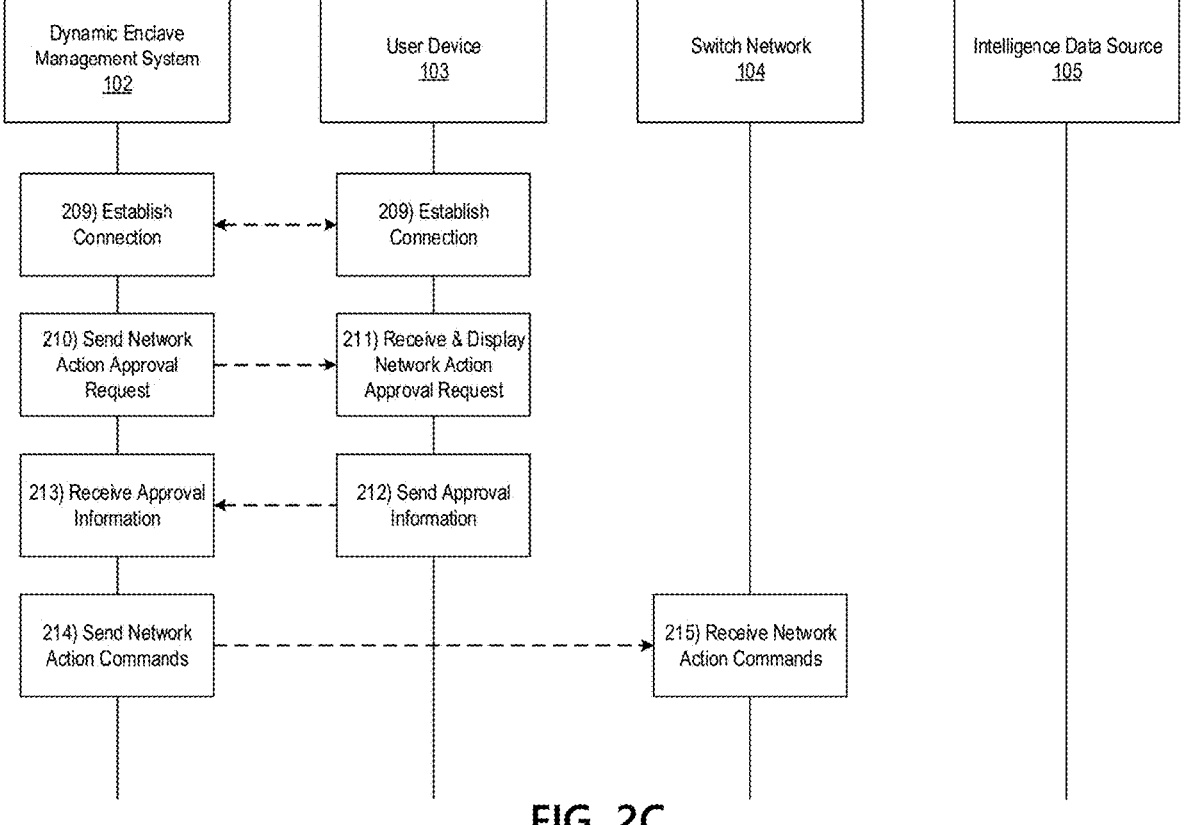

Referring to FIG. 2C, at step 209, the dynamic enclave management system 102 may establish a connection with the user device 103. For example, the dynamic enclave management system 102 may establish a third wireless data connection with the user device 103 to link the dynamic enclave management system 102 to the user device 103 (e.g., in preparation for sending network action approval requests). In some instances, the dynamic enclave management system 102 may identify whether or not a connection is already established with the user device 103. If a connection is already established with the user device 103, the dynamic enclave management system 102 might not re-establish the connection. Otherwise, if a connection is not yet established with the user device 103, the dynamic enclave management system 102 may establish the third wireless data connection as described herein.

At step 210, the dynamic enclave management system 102 may send a network action approval request to the user device 103. In some instances, the dynamic enclave management system 102 may also send one or more commands directing the user device 103 to display the network action approval request. For example, the dynamic enclave management system 102 may send the network action approval request via the communication interface 113 and while the third wireless data connection is established.

At step 211, the user device 103 may receive the network action approval request sent at step 210. In some instances, the user device 103 may also receive the one or more commands directing the user device 103 to display the network action approval request. Based on or in response to the one or more commands directing the user device 103 to display the network action approval request, the user device 103 may display the network action approval request. For example, the user device 103 may display a graphical user interface similar to graphical user interface 300, which is illustrated in FIG. 3, and which prompts a user to accept or deny a proposed network action for a given network enclave (e.g., via a user interface element displayed on the graphical user interface 300).

At step 212, the user device 103 may receive and send approval information to the dynamic enclave management system 102. For example, the user device 103 may send approval information while the third wireless data connection is established. In some instances, the user device 103 may send information indicating whether or not the requested network action was approved at the user device 103.

At step 213, the dynamic enclave management system 102 may receive the approval information sent at step 212. For example, the dynamic enclave management system 102 may receive the approval information while the third wireless data connection is established. In instances where the approval information indicates that the network action was approved, the dynamic enclave management system 102 may proceed to step 214. Accordingly, in this example, the selection of the approval interface element may effectively trigger initiation of the network action by the dynamic enclave management system 102 and/or switch network 104. Otherwise, if the approval information indicates that the network action was not approved, the dynamic enclave management system 102 may return to step 210 to send an alternative network action approval request. Although approval information is illustrated as being received from a single user device, in some instances, consensus approval may be received from a plurality of different approvers without departing from the scope of the disclosure.

At step 214, the dynamic enclave management system 102 may send one or more network action commands directing the switch network 104 (e.g., network switches 106A-106N) to execute a network action. For example, the dynamic enclave management system 102 may send one or more commands directing network switches for a network enclave corresponding to the associated threat score to execute one or more actions. For example, the dynamic enclave management system 102 may cause the network switches 106A-106N to isolate a geographic region corresponding to the network enclave (e.g., a location of the threat). In this example, the network enclave may be isolated by closing corresponding ports, stopping network traffic, changing associated protocols, increasing traffic logging, and/or performing other actions. Additionally or alternatively, the dynamic enclave management system 102 may cause the network switches 106A-106N to isolate a different network enclave corresponding to a different geographic region (e.g., a defensive isolation of an area to prevent spread of the threat into the area). Additionally or alternatively, the dynamic enclave management system 102 may cause the network switches 106A-106N to modify a boundary of one or more network enclaves (e.g., the enclave corresponding to the threat or a different enclave). Additionally or alternatively, the dynamic enclave management system 102 may cause the network switches 106A-106N to log inbound network traffic. Additionally or alternatively, the dynamic enclave management system 102 may cause the network switches 106A-106N to route inbound network traffic to an isolation system for analysis. Additionally or alternatively, the dynamic enclave management system 102 may cause the network switches 106A-106N to execute other network security actions. In some instances, the dynamic enclave management system 102 may send the one or more network action commands to the switch network 104 via the communication interface 113 and while the first wireless data connection is established. In some instances, the dynamic enclave management system 102 may send the one or more network action commands automatically (e.g., based on identifying that the threat score falls within the third range at step 208). In other instances, the dynamic enclave management system 102 may send the one or more network action commands in response to receiving the approval information (e.g., at step 213).

At step 215, the switch network 104 (e.g., network switches 106A-106N) may receive the network action commands sent at step 214. For example, the network switches 106A-106N may receive the network action commands while the first wireless data connection is established.

Figure 2D:
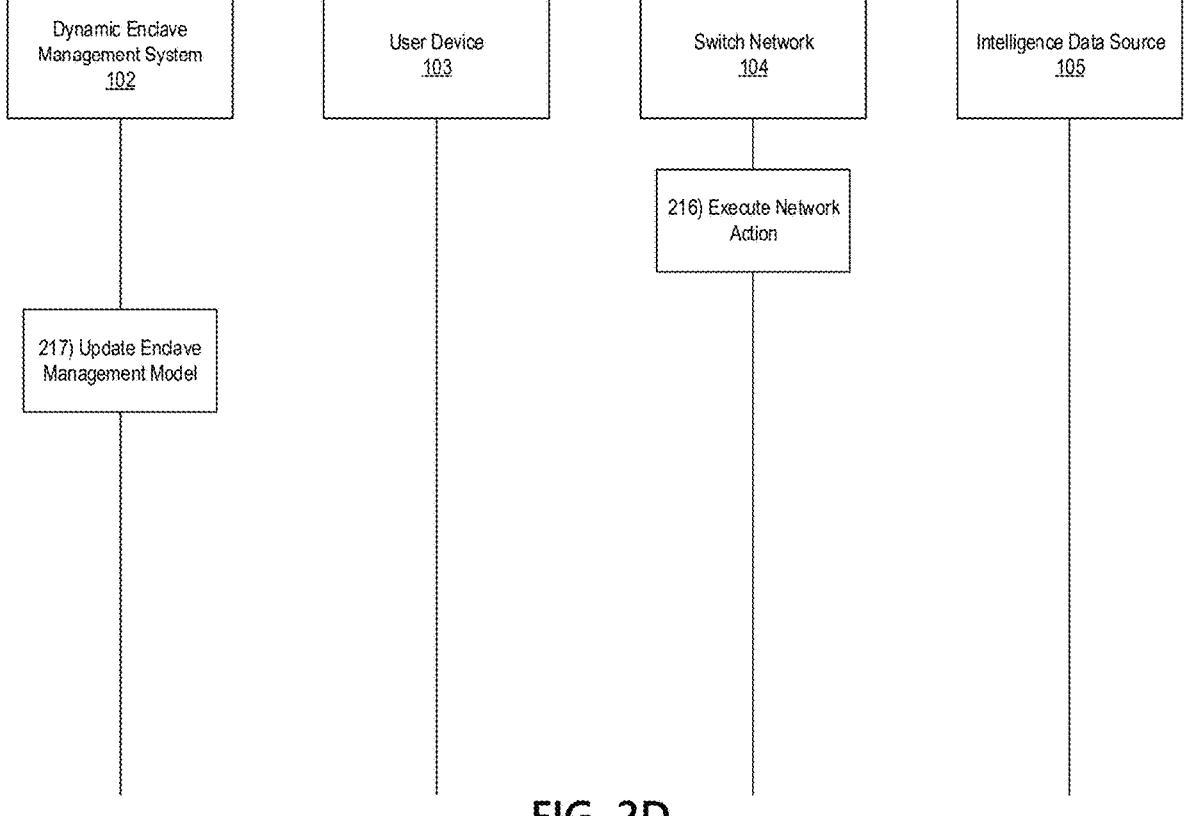

Referring to FIG. 2D, at step 216, based on or in response to the one or more network action commands received at step 215, the switch network 104 (e.g., network switches 106A-106N) may execute one or more network security actions. For example, the network switches 106A-106N may isolate a geographic region corresponding to the network enclave (e.g., a location of the threat). Additionally or alternatively, the network switches 106A-106N may isolate a different network enclave corresponding to a different geographic region (e.g., a defensive isolation of an area to prevent spread of the threat into the area). Additionally or alternatively, the network switches 106A-106N may modify a boundary of one or more network enclaves (e.g., the enclave corresponding to the threat or a different enclave). Additionally or alternatively, the network switches 106A-106N may log inbound network traffic. Additionally or alternatively, the network switches 106A-106N may route inbound network traffic to an isolation system for analysis. Additionally or alternatively, the network switches 106A-106N may execute other network security actions.

At step 217, the dynamic enclave management system 102 may update the enclave management model based on the current intelligence information, the threat scores produced by the enclave management model, the network actions, and/or other information. In doing so, the dynamic enclave management system 102 may continue to refine the enclave management model using a dynamic feedback loop, which may, e.g., increase the accuracy and effectiveness of the enclave management model in scoring threat levels associated with various network enclaves and executing network security actions accordingly.

In some instances, the dynamic enclave management system 102 may continuously refine the enclave management model. In some instances, the dynamic enclave management system 102 may maintain accuracy thresholds for the enclave management system 102, and may pause refinement (through the dynamic feedback loops) of the enclave management model if the corresponding accuracy (e.g., in terms of accurate threat identification/remediation) is identified as greater than the corresponding accuracy threshold. Similarly, if the accuracy falls to be equal or less than the given accuracy threshold, the dynamic enclave management system 102 may resume refinement of the corresponding model through the corresponding dynamic feedback loop.

The enclave management model may then continue to monitor the threat levels associated with the various enclaves (e.g., by generating updates threat scores, comparing to the thresholds, or the like). In some instances, if the enclave management model detects that the threat level has decreased for a particular network enclave, the enclave management model may cause the network switches (106A-106N) to soften and/or otherwise suspend the security measures applied to that enclave (e.g., reduce from network isolation to traffic monitoring, or the like). Similarly, if the enclave management model detects that the threat level has increased for the particular network enclave, the enclave management model may cause the network switches (106A-106N) to increase the security measures applied to that enclave (e.g., elevate from traffic monitoring to network isolation, or the like).

Although the above described event sequence primarily describes the use of network enclaves to isolate particular geographic regions, such enclaves may be used on an enterprise by enterprise, and/or other group by group (e.g., based on job title, or the like) basis, which may, in some instances, span across multiple geographic regions.

Figure 4:
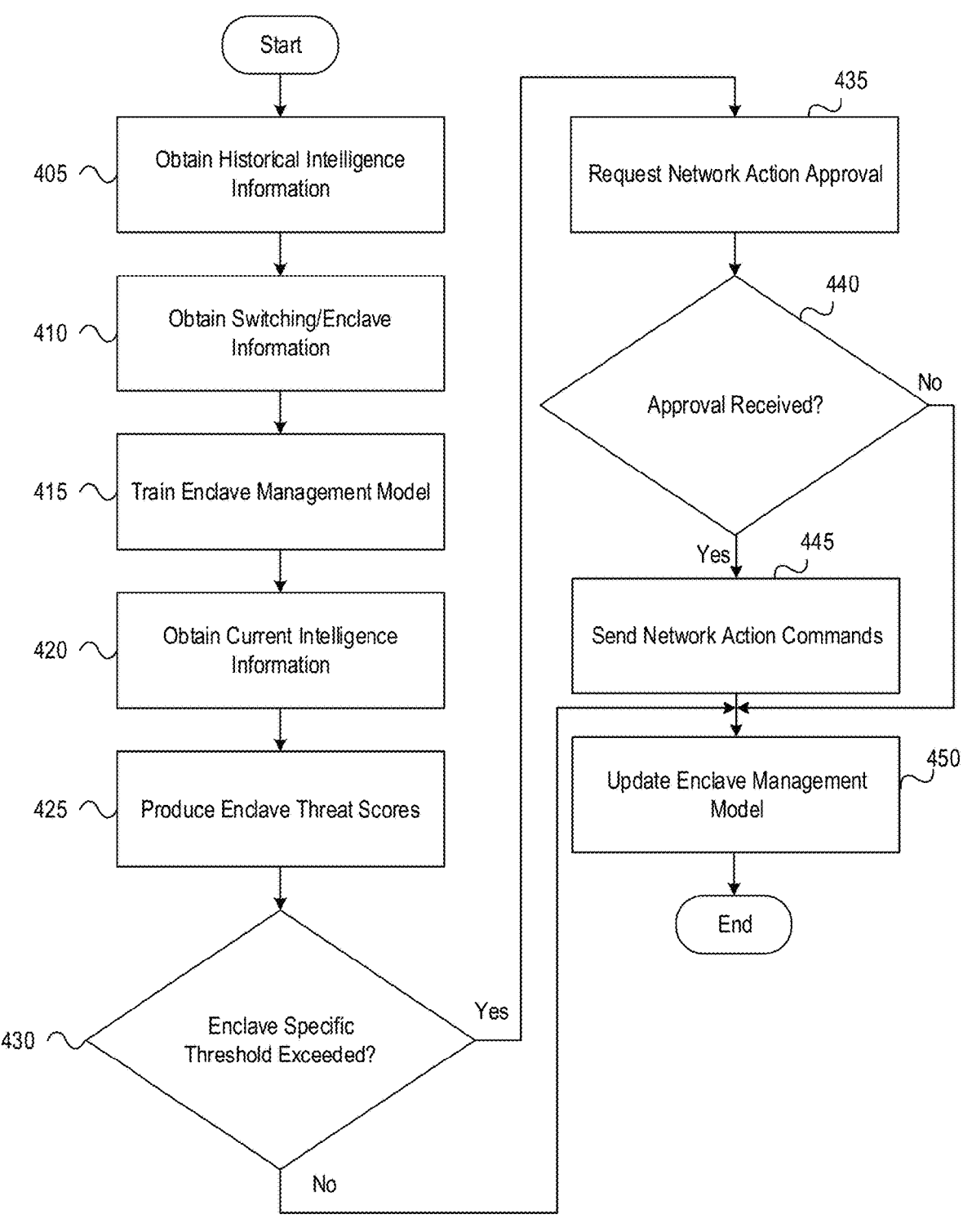
FIG. 4 depicts an illustrative method for implementing dynamic regional network enclaves using active threat intelligence in accordance with one or more example embodiments.

FIG. 4 depicts an illustrative method for managing dynamic network enclaves with artificial intelligence for active threat mitigation in accordance with one or more example embodiments. Referring to FIG. 4, at step 405, a computing platform comprising a memory, one or more processors, and a communication interface may obtain historical intelligence information. At step 410, the computing platform may obtain switching/enclave information. At step 415, the computing platform may train an enclave management model. At step 420, the computing platform may obtain current intelligence information. At step 425, the computing platform may produce enclave threat scores by inputting the current intelligence information into the enclave management model. At step 430, the computing platform may identify whether or not an enclave specific threat threshold is exceeded. If the threshold is met or exceeded, the computing platform may proceed to step 435.

At step 435, the computing platform may request approval of a network action from a user device. At step 440, the computing platform may identify whether or not approval is received. If approval is received, the computing platform may proceed to step 445 and may send network action commands. Then, at step 450, the computing platform may update the enclave management model. Otherwise, if approval is not received, the computing platform may proceed to step 450 without performing step 445.

Returning to step 430, if the enclave specific threshold is not met or exceeded, the computing platform may proceed directly to step 450 to update the enclave management model as described above.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:

obtain historical intelligence information corresponding to a plurality of intelligence parameters, wherein the plurality of intelligence parameters comprise: government intelligence, open source intelligence, and indicators of compromise (IOC);
train, using the historical intelligence information, an enclave management model, wherein training the enclave management model configures the enclave management model to identify network actions to address current intelligence information, to produce threat scores, and to identify regional enclaves, each defining network boundaries for the respective regional enclaves, and wherein the enclave management model comprises a supervised machine learning model, wherein training the enclave management model comprises configuring a first weight value of 0.3 for the government intelligence parameter, a second weight value of 0.3 for the open source intelligence parameter, and a third weight value of 0.4 for the IOC parameter;
receive first current intelligence information corresponding to the plurality of intelligence parameters;
input, into the enclave management model, the current intelligence information, wherein inputting the current intelligence information into the enclave management model causes the enclave management model to produce a threat score for a first enclave and first network actions to address the current intelligence information;
compare the threat score to a threat threshold; and
based on identifying that the threat score meets or exceeds the threat threshold, send one or more commands directing one or more network switching devices, corresponding to the first enclave, to execute the first network actions, wherein sending the one or more commands directing the one or more network switching devices to execute the first network actions causes the one or more network switching devices to execute the first network actions.

2. The computing platform of claim 1, wherein the plurality of intelligence parameters further comprise: internet information, real time event information, risk indicators, sanction information, local regulations, cyber threat information, geographic information, and regionally specific threat profile information.

3. The computing platform of claim 1, wherein training the enclave management model comprises training a supervised machine learning model by labelling the historical intelligence information with a threat indicator prior to inputting the historical intelligence information into the enclave management model for training.

4. The computing platform of claim 1, wherein the memory stores additional computer readable instructions that, when executed by the at least one processor, cause the computing platform to:
obtain network switching information defining location and connection information for the one or more network switching devices.

5. The computing platform of claim 4, wherein training the enclave management model comprises establishing a switch matrix, based on the network switching information, defining correlations between a plurality of geographic regions, including a first geographic region, and corresponding network enclaves, comprising network switching devices, of the one or more network switching devices, configured to establish a network boundary for the corresponding geographic region.

6. The computing platform of claim 1, wherein the first current intelligence information corresponds to a plurality of different geographic regions.

7. The computing platform of claim 1, wherein the threat threshold is specific to the first enclave, and wherein at least one other enclave has a different threat threshold.

8. The computing platform of claim 1, wherein the first network actions comprise:

causing the one or more network switching devices to isolate the first enclave, causing the one or more network switching devices to isolate a second enclave, different than the first enclave, causing the one or more network switching devices to modify a boundary of the first enclave, causing the one or more network switching devices to modify a boundary of a second enclave, causing the one or more network switching devices to log inbound network traffic, and causing the one or more network switching devices to route the inbound network traffic to an isolation system for analysis.

9. The computing platform of claim 8, wherein the second enclave corresponds to an origin of a threat identified in the current intelligence information.

10. The computing platform of claim 1, wherein the memory stores additional computer readable instructions that, when executed by the at least one processor, cause the computing platform to:

identify, at a second time, after a first time at which the threat score is produced, that an updated threat score for the first enclave is less than the threat threshold; and based on identifying that the updated threat score is lower than the threat threshold, suspending the first network actions.

11. The computing platform of claim 1, wherein the supervised machine learning model comprises a decision tree model, an ensemble model, a neural network, a linear regression model, an artificial neural network, logistic regression model, and a support vector machine.

12. The computing platform of claim 1, wherein training the enclave management model comprises training, once the enclave management model has been trained using supervised learning techniques, the enclave management model using unsupervised learning techniques.

13. The computing platform of claim 12, wherein the unsupervised learning techniques include classiciation, regression, clustering, anomaly detection, and artificial neutral networks.

14. The computing platform of claim 1, wherein the first enclave defines a geographic boundary.

15. The computing platform of claim 1, wherein the first enclave defines a non-geographic boundary, corresponding to one of an enterprise or a group of individuals within the enterprise characterized by a common job title, wherein the enterprise or the group of individuals spans across multiple geographic regions.

16. The computing platform of claim 1, wherein:

comparing the threat score to the threat threshold further includes comparing the threat score to a plurality of threat score ranges to identify which of the plurality of threat score ranges the threat score falls within, each of the plurality of threat score ranges is associated with a particular network security action, and is dynamically adjustable, and sending the one or more commands directing the one or more network switching devices to execute the first network actions comprises the particular network security action associated with a threat score range into which the threat score falls.

17. The computing platform of claim 16, wherein the plurality of threat score ranges includes three threshold ranges, including:

a first threshold range including threat scores between 0 and 3 inclusive, a second threshold range, including threat scores between 4 and 7 inclusive, and a third threshold range including threat scores between 8 and 10 inclusive.

18. The computing platform of claim 16, wherein the plurality of threat score ranges are associated with the first enclave, wherein a second plurality of threat score ranges are associated with a second enclave, different than the first enclave, and wherein the second plurality of threat score ranges are different than the plurality of threat score ranges.

19. A method comprising:

at a computing platform comprising at least one processor, a communication interface, and memory:

obtaining historical intelligence information corresponding to a plurality of intelligence parameters, wherein the plurality of intelligence parameters comprise: government intelligence, open source intelligence, and indicators of compromise (IOC);

training, using the historical intelligence information, an enclave management model, wherein training the enclave management model configures the enclave management model to identify network actions to address current intelligence information, to produce threat scores, and to identify regional enclaves, each defining network boundaries for the respective regional enclaves, and wherein the enclave management model comprises a supervised machine learning model, wherein training the enclave management model comprises configuring a first weight value of 0.3 for the government intelligence parameter, a second weight value of 0.3 for the open source intelligence parameter, and a third weight value of 0.4 for the IOC parameter;

receiving first current intelligence information corresponding to the plurality of intelligence parameters;

inputting, into the enclave management model, the current intelligence information, wherein inputting the current intelligence information into the enclave management model causes the enclave management model to produce a threat score for a first enclave and first network actions to address the first current intelligence information;

comparing the threat score to a threat threshold; and based on identifying that the threat score meets or exceeds the threat threshold, sending one or more commands directing one or more network switching devices, corresponding to the first enclave, to execute the first network actions, wherein sending the one or more commands directing the one or more network switching devices to execute the first network actions causes the one or more network switching devices to execute the first network actions.

20. One or more non-transitory computer-readable media storing instructions that, when executed by a computing platform comprising at least one processor, a communication interface, and memory, cause the computing platform to:

obtain historical intelligence information corresponding to a plurality of intelligence parameters, wherein the plurality of intelligence parameters comprise: government intelligence, open source intelligence, and indicators of compromise (IOC);

train, using the historical intelligence information, an enclave management model, wherein training the enclave management model configures the enclave management model to identify network actions to address current intelligence information, to produce threat scores, and to identify regional enclaves, each defining network boundaries for the respective regional enclaves, and wherein the enclave management model comprises a supervised machine learning model, wherein training the enclave management model comprises configuring a first weight value of 0.3 for the government intelligence parameter, a second weight value of 0.3 for the open source intelligence parameter, and a third weight value of 0.4 for the IOC parameter;

receive first current intelligence information corresponding to the plurality of intelligence parameters;

input, into the enclave management model, the current intelligence information, wherein inputting the current intelligence information into the enclave management model causes the enclave management model to produce a threat score for a first enclave and first network actions to address the first current intelligence information;

compare the threat score to a threat threshold; and based on identifying that the threat score meets or exceeds the threat threshold, send one or more commands directing one or more network switching devices, corresponding to the first enclave, to execute the first network actions, wherein sending the one or more commands directing the one or more network switching devices to execute the first network actions causes the one or more network switching devices to execute the first network actions.

*   *   *   *   *